United States Patent Office 3,586,722
Patented June 22, 1971

---

3,586,722
SULFONYL PEROXIDES
Jose Sanchez, Grand Island, and Richard Anthony Bafford, Tonawanda, N.Y., assignors to Pennwalt Corporation, East Orange, N.J.
No Drawing. Filed Oct. 31, 1968, Ser. No. 772,418
Int. Cl. C07c *161/00;* C08f *1/60*
U.S. Cl. 260—607                 7 Claims

ABSTRACT OF THE DISCLOSURE

Sulfonyl peroxides of the formula:

$$R_1R_2R_3C-SO_2-OO-C(O)R_4$$

where $R_1$, $R_2$, and $R_3$ are alkyl or cycloalkyl or substituted alkyl radicals; $R_4$ is alkyl; and the tert radical can be a tricycloalkyl. For example, acetyl tert-butylsulfonyl peroxide and acetyl 1-adamantylsulfonyl peroxide.

A vinyl polymerization process wherein the above sulfonyl peroxides are used as polymerization initiators.

BACKGROUND OF THE INVENTION

(1) Field of the invention

This invention relates to novel sulfonyl peroxides and to the polymerization of vinyl monomers using these peroxides as the polymerization initiators.

(2) Description of the prior art

Art exists on the sulfoxidation of saturated unbranched cyclic and acylic hydrocarbons in the presence and absence of acetic anhydride to give acetyl sec-alkyl-sulfonyl peroxides and sec-alkylsulfonic acids, respectively: L. Orthner, Angew. Chem.; 62, 302–305 (1950); R. Graf, Ann., 578, 50–82 (1952).

German Patent 840,093 (1952) reports a process for the preparation of sulfonic acids using the sulfoxidation reaction. Among the hydrocarbon substrates used were isobutane, 3-methylheptane and methylcyclohexane.

U.S. 3,325,387 (1967) asserts a process for the preparation of sulfonic acids from higher straight chain hydrocarbons, sulfur dioxide and oxygen. Electromagnetic radiation of $10^{-3}$ to $10^2$ A. wavelength was employed. A low content of branched chain hydrocarbons in the feed hydrocarbons is required.

German Pat. 917,427 (1954) reports a process for the preparation of sulfonic acids using the sulfoxidation reaction and mentions use of acetyl methylcyclohexylsulfonyl peroxide as an initiator for the process.

French Pat. 1,367,074 (1964) makes use of acetyl methylcyclohexylsulfonyl peroxide as an initiator for vinyl chloride polymerizations.

SUMMARY OF THE INVENTION (A) Sulfonyl peroxides having the general formula:

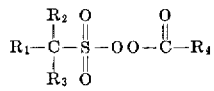

where: (1) $R_1$, $R_2$, and $R_3$ are each alkyl radicals having 1–10 carbon atoms, cycloalkyl radicals having 3–7 ring carbon atoms and not more than 10 carbon atoms; or the corresponding halo, cyano, azido, carboxy, lower alkoxycarbonyl, and lower acyloxy substituted alkyl radicals;

(2) $(R_1R_2R_3)C-$ may be a tricycloalkyl radical having a total of 6–20 carbon atoms; and (3) $R_4$ is an alkyl radical having 1–20 carbon atoms or a substituted alkyl radical where the substituents may be halo, cyano, azido, carboxy, lower alkoxycarbonyl, or lower acyloxy.

(B) In the process wherein solid polymer is produced by polymerizing vinyl monomer using free radicals as the polymerization initiator, the improvement which consists essentially of using as the free radical affording agent a sulfonyl peroxide as defined in (A), above. An aqueous medium process is preferred although bulk and solution processes may also be employed.

DESCRIPTION OF THE INVENTION AND WORKING EXAMPLES

Each alkyl or substituted alkyl radical $R_1$, $R_2$, or $R_3$ has 1–10 carbon atoms. Preferably the tertiary radical joined to S in the formula has 4–12 carbon atoms. Substituents may be halo (e.g., F, Cl, Br, or I, preferably Cl or Br), cyano, azido, carboxy, lower alkoxycarbonyl or lower acyloxy.

$R_4$ is an alkyl or halo, cyano, azido, carboxy, lower alkoxycarbonyl or lower acyloxy substituted alkyl radical having 1–20 carbon atoms and preferably has 1–12 carbon atoms.

Each $R_1$, $R_2$, and $R_3$ may be a cycloalkyl or substituted cycloalkyl radical. Cycloalkyl: may be a single ring or have two or more fused rings. Desirably the single ring has in the ring 3–12 carbon atoms, and preferably 5–8 carbon atoms. Preferably the total number of carbon atom in the radical is 5–12. Cyclopentyl, cyclohexyl, and the radical corresponding to decalin are preferred radicals.

The tertiary radical $R_1R_2R_3C-$ may be a tricycloalkyl or alkyl, halo, cyano, azido, carboxy, lower alkoxycarbonyl or lower acyloxy substituted tricycloalkyl having 6–20 carbon atoms, usually 7–13 carbon atoms, such as adamantyl which has 10 carbon atoms.

Several illustrations of sulfonyl peroxides of the invention are set out in the working examples.

Saturated acyclic and cyclic hydrocarbons, or the corresponding halo, cyano, azido, carboxy, lower alkoxycarbonyl or lower acyloxy substituted hydrocarbons, with tertiary hydrogens are easily sulfoxidized in the presence of a carboxylic anhydride to give tert-alkysulfonyl peroxides.

Proton magnetic resonance (p.m.r.) spectra of the products reveal that when both tertiary and secondary C—H bonds are present in the isoalkane the tertiary C—H bonds react preferentially. The selectivity of the sulfoxidation reaction for tertiary C—H bonds to secondary C—H bonds is about 40 to 1 at 0° C.

These sulfonyl peroxides of the invention may be formed by conventional sulfoxidation procedures. For purposes of illustration only, a generalized procedure is set out herein.

These sulfonyl peroxides can be prepared by passing excess sulfur dioxide gas and oxygen (mole ratio of 1 to 1 up to 4 to 1, preferably 2 to 1) through a 1 to 1, up to 20 to 1, preferably about 10 to 1, mole ratio of hydrocarbon substrate to carboxylic anhydride, while the mixture is vigorously stirred and the temperature is held at $-20°$ to $+40°$, preferably about 0° to 30°. Temperatures below 0° give very slow reactions whereas temperatures above 30° lead to excessive product decomposition. The reaction mixture is preferably irradiated with a "sun lamp"; however, any lamp giving off U.V. radiation would suffice. The reaction can also be initiated thermally by heating above 30°; preferably 30–50° C. Peroxides such as diisopropyl peroxydicarbonate can be used to initiate the reaction at 30° to 50°, which then can be carried out thermally. By-products from peroxide initiation are usually water soluble and can be removed later in the workup. The reaction is usually allowed to proceed for 2 to 6 hours, preferably 3 hours.

The resulting acyl sulfonyl peroxides are usually insoluble in the hydrocarbon substrate and are usually more dense than the substrate, having specific gravities of about 1.1, which facilitates the isolation of the products.

The heavy product layer is preferably drawn off into ice-water in order to hydrolyze unreacted carboxylic anhydride and to reduce any by-product alkylperoxysulfonic acid, with sulfurous acid, to a water soluble alkylsulfonic acid.

The product phase can be taken up in a polar solvent such as diethyl ether or methylene chloride, washed with water several times and dried with a desiccant such as sodium sulfate or magnesium sulfate. The filtered solution can then be stripped of volatile solvents and impurities using a vacuum rotating evaporator (0.1 mm.) to give the peroxide which may be a clear, colorless liquid or a white solid.

Alternately the hydrocarbon substrate, especially in the case of gases such as isobutane, and the carboxylic anhydride can be dissolved in a solvent which is inert to the sulfoxidation reaction such as methylene chloride. In these cases the mole ratio of hydrocarbon to carboxylic anhydride can be from 1 to 1 up to 20 to 1, preferably 10 to 1, and the percentage of substrate in the solvent by volume can be between 5% and 50%, preferably 50%. Excess sulfur dioxide and oxygen gases (mole ratio of 1 to 1 up to 4 to 1, preferably 2 to 1) can be bubbled through the vigorously stirred solution for 2 to 6 hours, preferably 3 hours. The reaction can be initiated by U.V. irradiation; or thermally at 30° to 50°; or with free-radical initiators such as diisopropyl peroxydicarbonate. The temperature can be held at $-20°$ to $+30°$, preferably at 0° to 10° with substrates such as isobutane.

The product is usually soluble in the polar solvent, therefore, the product may be isolated by pouring the organic solution into one-quarter its volume of water and partially stripping the mixture, separating the organic phase from the aqueous phase, washing with water several times, drying over anhydrous sodium sulfate and vacuum stripping (0.1 mm.) to give a clear colorless liquid or a white solid.

Tertiary hydrocarbons with few methylene groups are advantageous, since polysulfoxidation (more than one attack on the same molecule) and production of mixed isomeric peroxides are minimized with these hydrocarbons.

Hydrocarbons containing more than traces of olefins or aromatic hydrocarbons should be avoided, since these compounds are known to be inhibitors of the sulfoxidation reaction. Water and alcohols should not be present, since they react with the carboxylic anhydride and also with the peroxysulfonic acid in the presence of sulfur dioxide, to give unwanted sulfonic and sulfuric acids.

VINYL POLYMERIZATION

These peroxides have much lower decomposition temperatures than acyl sec-alkylsulfonyl peroxides; they are lower temperature initiators. These peroxides have utility in vinyl polymerizations at low temperatures, i.e. below about 40° C., giving polymers that are more linear, have higher molecular weights and are more stereoregular, and have improved physical properties, such as higher heat-distortion temperatures, greater oxidative stability and greater toughness. Lower members of the acyl tert-alkylsulfonyl peroxides, such as acetyl tert-butylsulfonyl peroxide, have few or no easily abstractable secondary hydrogens, thus, decreasing or even eliminating polymer terminations by this type of chain transfer.

The sulfonyl peroxides of the invention are useful in any of the presently known vinyl monomer polymerization processes that use free radicals as the polymerization initiator, i.e., bulk, solution, or aqueous medium. These peroxides are especially useful in aqueous medium processes, such as, suspension polymerization. As has been stated, these peroxides are efficient at low temperatures, below about 40° C.

The expression "vinyl monomer" includes all those organic compounds containing at least one $CH_2=C<$ group in their molecule. Examples of these monomers are ethylene, styrene, α-methylstyrene, dichlorostyrene, vinyl naphthalene, vinyl phenol, acrylic acid and the alpha-alkyl substituted acrylic acids; the esters of these unsaturated acids, such as methyl acrylate, methyl methacrylate, butyl methacrylate, and propyl acrylate; the vinylidene halides, such as vinylidene chloride, vinylidene bromide and vinylidene fluoride; vinyl esters of the inorganic acids, such as the halogen acids and hydrocyanic acid, as vinyl chloride, vinyl bromide, acrylonitrile, and methacrylonitrile; the vinyl esters of the monocarboxylic acids, such as vinyl acetate, vinyl chloroacetate, vinyl benzoate, vinyl valerate, and vinyl caproate; the vinyl esters of the polycarboxylic acids, such as divinyl succinate, divinyl adipate, vinyl allyl phathalate, vinyl methallyl pimelate, and vinyl methyl glutarate; the vinyl esters of the unsaturated acids, such as vinyl acrylate, vinyl crotonate, and vinyl methacrylate; the vinyl ethers, such as vinyl ethyl ether, vinyl butyl ether, and vinyl allyl ether; the vinyl ketones, such as vinyl butyl ketone, and vinyl ethyl ketone; and the allyl derivatives, such as allyl acetate, allyl butyrate, diallyl phthalate, diallyl adipate, methallyl propionate, allyl chloride, methallyl chloride, allyl acrylate, and methallyl methacrylate. The conjugated dienes, such as butadiene and chloroprene, are suitable.

These compounds are also effective as catalysts for the copolymerization of the above-described compounds with each other or with other types of polymerizable organic compounds, particularly those containing at least one ethylenic linkage; such as the saturated esters of the unsaturated acids, e.g., diethyl maleate, dibutyl crotonate, and the like.

EXAMPLE 1

The preparation of acetyl tert-butyl-sulfonyl peroxide

A 300 ml. jacketed reactor equipped with a thermometer and a fitted glass dispersion stirrer was charged with 150 ml. of methylene chloride (Baker AR 9324) and 40.8 g. (0.4 mole) of acetic anhydride. The solution was vigorously stirred at 0°, while isobutane (Phillips Pure Grade) was added until the solution was saturated. About 10 ml. of isobutane liquid at 0° was taken up, therefore, about 6.0 g. (ca. 0.1 mole) of isobutane was present at 0°. Sulfur dioxide (Matheson), oxygen (Matheson) and isobutane gases were then introduced at rates of 60 cc./min. 33 cc./min. and 95 cc./min., respectively, and the solution was irradiated by a Westinghouse 275 watt "sun lamp" for 6.0 hours at 0°. Irradiation and gas flows were stopped and the solution was added to 100 ml. of deionized water and the mixture was partially stripped at 0° using a vacuum rotating evaporator (15 mm.). The organic phase was washed several times with water (4× 50 ml.), dried over anhydrous sodium sulfate and stripped of methylene chloride. A yield of 39 g. (50% of theory) of white solid was obtained which was recrystallized three times from ether at Dry Ice temperature to give 28 g. of white granular solid, M.P. 35–37°, which had an "active oxygen" content of 7.87%. The theoretical "active oxygen" of acetyl tert-butylsulfonyl peroxide is 8.15%, hence, the assay of the product was 96.6%.

An infrared spectrum of the product showed a carbonyl peak at 1820 cm.$^{-1}$, an asymmetric $SO_2$ peak at 1170 cm.$^{-1}$, a symmetric $SO_2$ peak at 1050 cm.$^{-1}$ and an O—O peak at 995 cm.$^{-1}$. One spot was seen on a thin layer chromatography plate.

A similar 0.2 mole run gave a 60% yield of crude product which was recrystallized to give a product with an "active oxygen" content of 7.55% (92.7% assay).

A proton magnetic resonance spectrum, obtained on an A–60 (Varian Associates) Proton Magnetic Resonance Spectrometer, operated at 60 mHz. and using tetramethyl silane as an internal standard (0.0 Hz.), showed two singlet peaks with relative areas of 3 and 1 at −96 Hz. and −133 Hz., respectively. The peak at −133 Hz. corresponded to acetyl protons and the peak at −96 Hz. corresponds to tert-butyl protons. Had sulfoxidation also occurred at primary C—H bonds of isobutane, the proton magnetic resonance spectrum would have been much more complicated.

EXAMPLE 2

The preparation of acetyl 1-adamantyl-sulfonyl peroxide

The apparatus described in Example I was used in this experiment. The jacketed reactor was charged with 200 ml. of methylene chloride (Baker AR 9324) 40.8 g. (0.4 mole) of acetic anhydride and 13.6 g. (0.1 mole) of adamantane (Aldrich 10,027–7). Sulfur dioxide and oxygen were then added to the vigorously stirred solution at rates of 60 cc./min. and 33 cc./min. respectively, and the solution was irradiated by a Westinghouse 275 watt "sun lamp" for 3.0 hours at 30°. The resulting solution was partially stripped using a vacuum rotating evaporator (15 mm.) at 0° C. Then 200 ml. of water was added and the mixture was stirred for several hours at 0° C. to hydrolyze the acetic anhydride. The organic phase was washed several times with water (4× 50 ml.), dried over anhydrous sodium sulfate and the excess methylene chloride was stripped off employing a vacuum rotataing evaporator (0.1 mm.) to give 25 g. (91.0% of theory) of a viscous liquid. Continuous stripping of the product using a vacuum rotating evaporator (0.1 mm.) for 9.0 hours gave 18 g. (66% of theory) of glassy liquid which had an "active oxygen" content of 6.06%. Acetyl 1-adamantylsulfonyl peroxide has an "active oxygen" content of 5.83%. This indicates that 12% of this material is disulfoxidized.

A thin layer chromatogram showed the presence of four peroxides. An infrared spectrum showed a carbonyl peak at 1800 cm.$^{-1}$, an asymmetric $SO_2$ peak at 1180 cm.$^{-1}$, a symmetric $SO_2$ peak at 1045 cm.$^{-1}$ and an O—O peak at 990 cm.$^{-1}$. Also present were peaks from a carboxylic acid, probably acetic; therefore, the "active oxygen" of the peroxidic material is greater than 6.06%.

EXAMPLE 3

Additional peroxides were prepared. Their composition was confirmed by chromatographic and infrared analysis. These peroxides are shown below.

| Peroxide | Yield, percent | Assay, percent |
|---|---|---|
| Acetyl 1,1-dimethylbutylsulfonyl peroxide | 45 | 87 |
| Acetyl 1-ethyl-1-methylpropylsulfonyl peroxide | 39 | 90.2 |
| Acetyl 1,1-dimethyldecylsulfonyl peroxide | 39 | 90 |
| Acetyl tert-hexylsulfonyl [1] peroxide | 37.2 | 82 |
| Acetyl tert-heptylsulfonyl [2] peroxide | 41 | 88 |
| Acetyl 1,1,2,2-tetramethylpropylsulfonyl peroxide | 26 | 53 |
| Acetyl tert-amylsulfonyl peroxide | 64 | 92 |
| Acetyl 3-chloro-1,1-dimethylpropylsulfonyl peroxide | 16.3 | 76 |

[1] Prepared from Phillips "Isohexanes."
[2] Prepared from Phillips "Isoheptanes."

EXAMPLE 4

Half-life data

The low temperature character of the acetyl tert-alkylsulfonyl peroxides compared to similar acetyl sec-alkylsulfonyl peroxides is shown by the half-lives ($t_{1/2}$) of these peroxides determined in benzene at 30° C. These data are shown below.

HALF-LIFE DATA IN BENZENE AT 30° C.

| | Peroxide | Type [1] | $t_{1/2}$ (hrs.) |
|---|---|---|---|
| a | Acetyl tert-butylsulfonyl | 3 | 5.1 |
| b | Acetyl sec-butylsulfonyl | 2 | 17.9 |
| c | Acetyl tert-amylsulfonyl | 3 | 5.3 |
| d | Acetyl sec-pentylsulfonyl | 2 | 9.6 |
| e | Acetyl tert-hexylsulfonyl [2] | 3 | 3.2 |
| f | Acetyl sec-hexylsulfonyl | 2 | 7.9 |
| g | Acetyl norbornylsulfonyl | 2 | 11.9 |
| h | Acetyl 1-adamantylsulfonyl | 3 | 4.9 |

[1] 3=tert-alkylsulfonyl; 2=sec-alkylsulfonyl.
[2] Prepared from Phillips "Isohexanes."

EXAMPLE 5

Efficiency as initiator

The efficiencies" of several peroxides as initiators for vinyl chloride polymerizations were determined at 30°.

Pop bottles were charged with 105 ml. of triple-distilled water, 5 ml. of an aqueous 1% "Span 60" (Atlas) solution, 5 ml. of an aqueous 1% "Tween 60" (Atlas) solution and 10 ml. of an aqueous 1% "Methocel" (1500 cps., Dow) solution. These three materials were suspending agents. The bottles' contents were then frozen and varying amounts of each initiators (several bottles for each) were placed on top of the frozen masses. Then 50 g. of vinyl chloride monomer (VCl) was added to each bottle, the bottles were capped, placed in safety cages and placed in a 30° both for 16 hours. The bottles were then cooled to 0°, vented of unreacted vinyl chloride monomer and weighed. A plot of quantity of initiator versus polymer conversion was constructed for each initiator and the amount of initiator needed for 90% conversion under these conditions were determined. The results are summarized below.

| Initiator peroxide | Type [1] | Initiator required/100 g.VCl Moles×10[4] | Grams |
|---|---|---|---|
| Acetyl tert-butylsulfonyl | 3 | 1.53 | 0.030 |
| Acetyl sec-butylsulfonyl | 2 | 3.46 | 0.068 |
| Acetyl tert-amylsulfonyl (crude) [2] | 3 | 1.38 | 0.029 |
| Acetyl sec-pentylsulfonyl | 2 | 1.43 | 0.065 |
| Acetyl 1,1-dimethylbutylsulfonyl | 3 | 3.08 | 0.037 |
| Acetyl 1-ethyl-1-methylpropylsulfonyl | 3 | 1.43 | 0.032 |
| Acetyl tert-hexylsulfonyl [3] | 3 | 1.47 | 0.033 |
| Acetyl sec-hexylsulfonyl | 2 | 3.19 | 0.072 |
| Acetyl tert-heptylsulfonyl [4] | 3 | 1.80 | 0.043 |
| Acetyl sec-heptylsulfonyl | 2 | 3.36 | 0.080 |
| Acetyl 3-chloro-1,1-dimethylpropylsulfonyl | 3 | 1.60 | 0.039 |
| Acetyl 3-chloro-1-methylpropylsulfonyl | 2 | 5.50 | 0.127 |
| Acetyl norbornylsulfonyl | 2 | 4.48 | 0.105 |
| Acetyl 1-adamantylsulfonyl | 3 | 1.48 | 0.041 |

[1] 3=tert-alkylsulfonyl; 2=sec-alkylsulfonyl.
[2] Consists of 95% tert and 5% sec.
[3] Prepared from Phillips "Isohexanes."
[4] Prepared from Phillips "Isoheptanes."

These data demonstrate that the acetyl tert-alkylsulfonyl peroxides are considerably more efficient than comparable acetyl sec-alkylsulfonyl peroxide in VCl at 30°.

EXAMPLE 6

Several acetyl tert-alkylsulfonyl peroxides and comparable acetyl sec-alkylsulfonyl peroxides were evaluated as initiators for vinyl chloride polymerization at equal active oxygen levels. The procedure used in Example 5 was used in this example employing 40° C. as the temperature and 7 hours as the duration of the polymerization. The resulting percent conversions are summarized below.

Peroxide level=2.26×10$^{-4}$ mole/100 g. VCl

| Peroxide | Type [1] | Percent conversion |
|---|---|---|
| Acetyl tert-butylsulfonyl | 3 | 91.8 |
| Acetyl sec-butylsulfonyl | 2 | 67.5 |
| Acetyl tert-amylsulfonyl | 3 | 92.4 |
| Acetyl sec-pentylsulfonyl | 2 | 74.1 |

[1] 3=tert-alkylsulfonyl; 2=sec-alkylsulfonyl.

These data demonstrate that the acetyl tert-alkylsulfonyl peroxides attain 90% conversion in vinyl chloride at 40° C. in less time than comparable acetyl sec-alkylsulfonyl peroxides at similar "active oxygen" levels. Since time is money in the polymer industry, the acetyl tert-alkylsulfonyl peroxides are better initiators at 40° C. than comparable acetyl sec-alkylsulfonyl peroxides.

Thus, having described the invention, what is claimed is:
1. Peroxides having the formula:

$$R_1-\underset{\underset{R_3}{|}}{\overset{\overset{R_2}{|}}{C}}-\overset{\overset{O}{\|}}{\underset{\underset{O}{\|}}{S}}-OO-\overset{\overset{O}{\|}}{C}-R_4$$

where:
- $R_1$, $R_2$, and $R_3$ are each alkyl radicals having 1–10 carbon atoms, cycloalkyl radicals having 3–7 ring carbon atoms and not more than 10 carbon atoms; or the corresponding chloro or bromo substituted radicals;
- $(R_1R_2R_3)C-$ can be adamantyl; and
- $R_4$ is an alkyl radical having 1–12 carbon atoms.

2. Acetyl tert-butylsulfonyl peroxide.
3. Acetyl tert-amylsulfonyl peroxide.
4. Acetyl tert-hexylsulfonyl peroxide.
5. Acetyl tert-heptylsulfonyl peroxide.
6. Acetyl 1-adamantylsulfonyl peroxide.
7. Acetyl 3-chloro-1,1-dimethylpropylsulfonyl peroxide.

References Cited

Orthner: "Angew Chem.," vol. 62 (1950), pp. 302–305.

CHARLES B. PARKER, Primary Examiner

D. R. PHILLIPS, Assistant Examiner

U.S. Cl. X.R.

204—162; 260—47.63, 78.4, 80, 88.7, 89.1, 89.5, 91.1, 91.5, 91.7, 92.1, 92.3, 92.8, 93.5, 94.2, 94.9, 349, 464, 465.1, 468, 481, 488, 514, 526